(12) United States Patent
Ogawa et al.

(10) Patent No.: US 6,344,500 B1
(45) Date of Patent: Feb. 5, 2002

(54) AQUEOUS PRIMER COATING COMPOSITION AND ARTICLE COATED THEREWITH

(75) Inventors: Takeshi Ogawa; Tatsuya Itakura; Izumi Nishimura, all of Wako; Katsumi Mizuguchi, Hirakata; Hiroshi Iida, Hirakata; Masao Sakai, Hirakata, all of (JP)

(73) Assignees: Honda Giken Kogyo Kabushihi Kaisha, Tokyo; Nippon Bee Chemical Co., Ltd., Osaka, both of (JP)

( * ) Notice: Subject to any disclaimer, the term of this patent is extended or adjusted under 35 U.S.C. 154(b) by 0 days.

(21) Appl. No.: 09/708,712

(22) Filed: Nov. 9, 2000

(30) Foreign Application Priority Data

Nov. 15, 1999 (JP) ............................. 11-324690

(51) Int. Cl.$^7$ ............................. C08K 3/20; C08L 51/06
(52) U.S. Cl. ..................... 523/407; 525/107; 525/285; 525/327.5; 525/507
(58) Field of Search ............................. 523/407, 423; 525/107, 285, 327.5, 507

(56) References Cited

FOREIGN PATENT DOCUMENTS

| JP | 54153831 | | 12/1979 |
|----|----------|---|---------|
| JP | 7224244 | | 8/1985 |
| JP | 3182534 | * | 8/1991 |
| JP | 472337 | * | 3/1992 |
| JP | 5214188 | * | 8/1993 |
| JP | 6509383 | * | 10/1994 |
| JP | 718104 | | 1/1995 |
| JP | 07150107 | * | 6/1995 |
| JP | 7258596 | * | 10/1995 |
| JP | 10298490 | * | 11/1998 |
| WO | 9303104 | * | 2/1993 |

* cited by examiner

Primary Examiner—Robert Dawson
Assistant Examiner—D. Aylward
(74) Attorney, Agent, or Firm—Roylance, Abrams, Berdo & Goodman, L.L.P.

(57) ABSTRACT

The present invention provides: an aqueous primer coating composition of which the deterioration of the water resistance is prevented with the high adhesion maintained, and which is excellent in the gasohol resistance and the pigment dispersion stability; and a thing coated with this aqueous primer coating composition. The aqueous primer coating composition according to the present invention, comprises acid anhydride-modified poly(olefin chloride) emulsion resin (A), aqueous alkyd resin (B) and aqueous novolac-type epoxy resin (C), wherein the contents of the (A), (B), and (C) are (A) 20 to 60 weight %, (B) 10 to 60 weight %, and (C) 10 to 60 weight % in terms of solid content weight % to the total resin solid content in the composition. The coated thing, according to the present invention, is coated with the present invention aqueous primer coating composition.

6 Claims, No Drawings

AQUEOUS PRIMER COATING COMPOSITION AND ARTICLE COATED THEREWITH

BACKGROUND OF THE INVENTION

A. Technical Field

The present invention relates to: an aqueous primer coating composition that is fit for such as plastic materials; and a thing coated with this aqueous primer coating composition.

B. Background Art

Plastic materials used for automobile bumpers, molds and so on, generally, have bad wetting ability to coating compositions and are inferior in coatability. Especially, if the plastic materials are polyolefin resin molding materials such as a polypropylene resin, coatability and adhesion of an overcoating paint is extremely low. Therefore, a method of coating a primer before coating a paint is often adopted in order to ensure adhesion between the materials and the paint, and various solvent type or aqueous primers are proposed.

In recent years, developments of the aqueous primer are eagerly carried out. However, the aqueous primer has a demerit that the coatability and adhesion thereof is generally inferior to those of the solvent type primer. Therefore, various researches and developments are carried out in order to obtain an aqueous primer that is excellent in coatability and adhesion.

For example, various studies about aqueous primers comprising non-modified poly(olefin chloride) were performed (JP-A-214188/1993, JP-A-258596/1995 and so on). However, adhesion of the aqueous primer is not improved enough because the none-modified poly(olefin chloride) has low cohesive forces.

In addition, a primer comprising a modified poly(olefin chloride), obtained by modifying a poly(olefin chloride) with unsaturated polycarboxylic acid and/or acid anhydride in order to improve adhesion enough, is disclosed (JP-A-182534/1991 etc.). However, there was a demerit that water resistance became low because of modifying the poly(olefin chloride) with the highly water-soluble unsaturated polycarboxylic acid and/or acid anhydride.

On the other hand, it is disclosed that various capacities of the aqueous primer can be improved by mixing various other resins with the non-modified or modified poly(olefin chloride) in order to jointly use them. For example, an aqueous primer, comprising a urethane resin and an epoxy resin in addition to the modified poly(olefin chloride) in order to improve paint stability and capacities of coating film, is disclosed in JP-A-72337/1992. However, in this case, gasohol resistance is not enough, and further, pigment dispersion stability when mixing a pigment is not either enough. These gasohol resistance and pigment dispersion stability are, for example, capacities particularly demanded when the aqueous primer is applied to the automotive plastic materials. In addition, an aqueous primer comprising a carboxylic-acid-functional resin, an amine compound and water in addition to the specific poly(olefin chloride), is disclosed in JP-A-509383/1994. However, in this case, water resistance was not enough.

Thus, an aqueous primer having enough capacities in respect to all of adhesion, water resistance, gasohol resistance and pigment dispersion stability enough, has not yet been obtained.

SUMMARY OF THE INVENTION

A. Object of the Invention

An object of the present invention is to provide an aqueous primer coating composition of which the deterioration of the water resistance is prevented with the high adhesion maintained, and which is excellent in the gasohol resistance and the pigment dispersion stability.

B. Disclosure of the Invention

The present inventors diligently studied to solve the above-mentioned problems. As a result, they have found that an aqueous primer coating composition obtained by mixing an emulsion resin containing acid anhydride-modified poly(olefin chloride) with an aqueous alkyd resin and an aqueous novolac-type epoxy resin in a specific ratio can solve all the above-mentioned problems. The present invention has been completed in this way.

That is to say, an aqueous primer coating composition, according to the present invention, comprises acid anhydride-modified poly(olefin chloride) emulsion resin (A), aqueous alkyd resin (B) and aqueous novolac-type epoxy resin (C), wherein the contents of the (A), (B), and (C) are (A) 20 to 60 weight %, (B) 10 to 60 weight %, and (C) 10 to 60 weight % in terms of solid content weight % to the total resin solid content in the composition.

In addition, a coated thing, according to the present invention, is coated with the aqueous primer coating composition according to the present invention.

These and other objects and the advantages of the present invention will be more fully apparent from the following detailed disclosure.

DETAILED DESCRIPTION OF THE INVENTION

The aqueous primer coating composition, according to the present invention, comprises acid anhydride-modified poly(olefin chloride) emulsion resin (A), aqueous alkyd resin (B) and aqueous novolac-type epoxy resin (C), wherein the contents of the (A), (B), and (C) are (A) 20 to 60 weight %, (B) 10 to 60 weight %, and (C) 10 to 60 weight % in terms of solid content weight % to the total resin solid content in the composition. Hereinafter, to begin with, each component of this composition is described.

(Acid Anhydride-modified poly(olefin chloride))

The acid anhydride-modified poly(olefin chloride), as used in the present invention, is a polyolefin derivative comprising a poly(olefin chloride) moiety and an acid anhydride moiety as bonded to this poly(olefin chloride) moiety. The acid anhydride-modified poly(olefin chloride) preferably has a chlorine content of 10 to 30 weight %, an acid anhydride moiety content of 1 to 10 weight %, and a weight-average molecular weight of 20,000 to 200,000.

The poly(olefin chloride) moiety is a moiety comprising a polyolefin including a chlorine atom substituent. In addition, the acid anhydride moiety, for example, comprises a group as derived from an acid anhydride such as maleic anhydride, citraconic anhydride or itaconic anhydride, and is a modified moiety as obtained by grafting. The acid anhydride moiety may be a moiety comprising a group as derived either from only one acid anhydride or from two or more acid anhydrides.

Because the acid anhydride-modified poly(olefin chloride) preferably has an acid anhydride moiety content in the range of 1 to 10 weight % and a relatively low chlorine content in the range of 10 to 30 weight %, it improves the gasohol resistance.

The acid anhydride-modified poly(olefin chloride) is a polyolefin as internally modified by reacting a polyolefin with an acid anhydride and chlorine, and is, for example, produced by reacting chlorine and an acid anhydride upon a polyolefin, wherein either one of the chlorine and the acid anhydride may be reacted upon the polyolefin earlier than the other. The reaction with the chlorine is, for example, carried out by introducing a chlorine gas into a solution containing a polyolefin. In addition, the reaction with the acid anhydride is, for example, carried out by reacting the acid anhydride upon a polyolefin (or poly(olefin chloride)) in the presence of a peroxide.

Examples of the polyolefin include: polyethylene, polypropylene, ethylene-propylene copolymers, ethylene-propylene-diene copolymers and polybutene; and hydrogenated products from copolymers such as styrene-butadiene-isoprene copolymers. These may be used either alone respectively or in combinations with each other. Among these, polypropylene is preferable because it is easily available and gives high adhesion.

Examples of the acid anhydride, as used for the modification, include maleic anhydride, citraconic anhydride and itaconic anhydride.

The acid anhydride-modified poly(olefin chloride) has a chlorine content in the range of preferably 10 to 30 weight %, more preferably 18 to 22 weight %. In the case where the chlorine content is less than 10 weight %, the composition has a low solubility into solvents, and the acid anhydride-modified poly(olefin chloride) is difficult to emulsify. On the other hand, in the case where the chlorine content is more than 30 weight %, the adhesion to the plastic materials is inferior and the gasohol resistance is also deteriorated.

The acid anhydride moiety content in the acid anhydride-modified poly(olefin chloride) is preferably in the range of 1 to 10 weight %, more preferably 1.2 to 5 weight %. In the case where the acid anhydride moiety content is less than 1 weight %, the emulsifying ability is low, and the gasohol resistance is deteriorated because the heat-sealing ability is low. On the other hand, in the case where the acid anhydride moiety content is more than 10 weight %, the acid anhydride group is so abundant that the water resistance is low.

The weight-average molecular weight of the acid anhydride-modified poly(olefin chloride) is preferably in the range of 20,000 to 200,000, more preferably 50,000 to 120,000. In the case where the weight-average molecular weight is less than 20,000, the strength and adhesion of a primer coating film resultant from the primer composition are low. On the other hand, in the case where the weight-average molecular weight is more than 200,000, the viscosity is so high that the acid anhydride-modified poly(olefin chloride) is difficult to emulsify, and further, the wetting ability to polyolefin base materials is low. In addition, the gasohol resistance is inferior, and further, the storage stability of the primer coating composition is bad.

(Emulsion Resin (A))

The acid anhydride-modified poly(olefin chloride) has high hydrophobicity and is difficult to stably disperse into water. Therefore, in the present invention, the acid anhydride-modified poly(olefin chloride) is emulsified with an emulsifier or basic substance and then used as emulsion resin (A).

The combining ratio of the emulsifier is fitly set in accordance with the combining ratio of the acid anhydride-modified poly(olefin chloride), the basic substance, or water, but is, for example, in the range of preferably 5 to 50 weight %, more preferably 10 to 30 weight %, based on the acid anhydride-modified poly(olefin chloride) 100 weight %. In the case where the combining ratio of the emulsifier is less than 5 weight %, the storage stability of the emulsion is low, and further, the aggregation or precipitation easily occurs on the way of polymerization in the below-mentioned production process for the emulsion. On the other hand, in the case where the combining ratio of the emulsifier is more than 50 weight %, the water resistance or weather resistance of the coating film is low because a large amount of emulsifier remains in the coating film.

The emulsifier is not especially limited, but examples thereof include: nonionic emulsifiers such as polyoxyethylene alkyl ethers, polyoxyethylene alkyl phenol ethers, polyoxyethylene aliphatic esters, polyoxyethylene polyhydric alcohol fatty acid esters, polyhydric alcohol fatty acid esters, polyoxyethylene propylene polyols, and alkylolamides; anionic emulsifiers such as alkyl sulfate ester salts, alkylphenolsulfonic acid salts, and sulfosuccinic acid ester salts; amphoteric emulsifiers such as alkylbetaines and alkylimidazolines; resin type emulsifiers such as polyoxyethylene-group-containing urethane resins and carboxylate-salt-group-containing urethane resins; and cationic emulsifiers such as imidazoline laurate, lauryltrimethylammonium chloride, stearylbetaine, and distearyldimethylammonium chloride. These may be used either alone respectively or in combinations with each other. Among these, the nonionic emulsifiers are preferable, because they have no ionic polar group of high hydrophilicity and therefore make the water resistance of the coating film good.

The combining ratio of the basic substance, used as a neutralizer, is also adjusted in accordance with the combining ratio of the acid anhydride-modified poly(olefin chloride), the emulsifier, or water. Particularly, the combining ratio of the basic substance is determined in consideration of sufficiently neutralizing an acidic functional group contained in such as the acid anhydride-modified poly(olefin chloride) or the emulsifier, but the combining ratio is, for example, in the range of preferably 0.2 to 10 equivalents, more preferably 0.5 to 4 equivalents, per equivalent of the acidic functional group contained in the acid anhydride-modified poly(olefin chloride). In the case where the ratio is less than 0.2 equivalents, the emulsification is not sufficient. In the case where the ratio is more than 10 equivalents, such as residual amines deteriorate the water resistance or promote the dechlorination. The pH of the emulsion, determined by combining the basic substance, is preferably in the range of 7 to 11, more preferably 7.5 to 10.5, most preferably 8 to 10. In the case where the pH of the emulsion is less than 7, the neutralization is not sufficient, therefore the storage stability of the emulsion might be low. On the other hand, in the case where the pH of the emulsion is more than 11, an excess of free basic substance exists in the emulsion, therefore the emulsion has so strong a smell of amine as to be difficult to use.

The basic substance, as used in the present invention, adds to the acid anhydride group and/or carboxyl group of the poly(olefin chloride) resin, and/or neutralizes these groups, thereby serving to enhance the hydrophilicity of the modified poly(olefin chloride) and, as a result, to improve the storage stability of the emulsion.

The basic substance is not especially limited, but examples thereof include what comprises at least one of an amine compound and ammonia. Examples of the amine compound include: monoamines such as trimethylamine, triethylamine, butylamine, dibutylamine and N-methylmorpholine; polyamines such as ethylenediamine, hexamethylenediamine, pirerazine, isophoronediamine, triethylenediamine and diethylenetriamine; and alkanolamines such as monoethanolamine, diethanolamine, triethanolamine, N-methyldiethanolamine, N,N-dimethylethanolamine and 2-amino-2-methylpropanol. These may be used either alone respectively or in combinations with each other. These may be used jointly with ammonia.

The combining ratio of water is preferably in the range of 50 to 95 weight %, more preferably 60 to 85 weight %, most preferably 65 to 80 weight %, of the entirety of the emulsion. In the case where the combining ratio of water is less than 50 weight %, the nonvolatile solid content in the emulsion is too much, therefore the storage stability of the emulsion might be deteriorated due to easy occurrence of such as aggregation. On the other hand, in the case where the combining ratio of water is more than 95 weight %, the production efficiency is deteriorated in the below-mentioned production process for the emulsion, and further, when the emulsion is for example used for the aqueous primer coating composition, the nonvolatile content in the aqueous primer coating composition is so low that the coating workability is bad.

The average particle diameter of polymer particles including a major proportion of acid anhydride-modified poly(olefin chloride) in the emulsion is not especially limited, but is preferably in the range of 0.01 to 10 μm, more preferably 0.03 to 5 μm, most preferably 0.05 to 1 μm. In the case where the average particle diameter of the polymer particles is smaller than 0.01 μm, a large quantity of emulsifier is necessary, therefore the water resistance and the weather resistance of the coating film are deteriorated. On the other hand, in the case where the average particle diameter of the polymer particles is larger than 10 μm, the storage stability of the emulsion is deteriorated, and further, the volume of the polymer particles is too large, therefore much melting heat and time to form a coating film is necessary, and the heat flowability is deteriorated, and, when the emulsion is for example used for a coating such as aqueous primer coating composition, the properties of the coating film such as appearance, water resistance and solvent resistance might be deteriorated.

As to the emulsifying process, conventional ones can be adopted, for example, as follows: the acid anhydride-modified poly(olefin chloride), the emulsifier, and the basic substance as a neutralizer, and further, if necessary, a solvent, are dissolved by heating or as they are, and then the resultant solution is emulsified into water with a commercially available emulsifying machine; or the acid anhydride-modified poly(olefin chloride) and the emulsifier, and further, if necessary, a solvent, are dissolved by heating or as they are, and then the resultant solution is emulsified into the basic substance-added water with a commercially available emulsifying machine. Or otherwise, a reversed-phase emulsion may be made by adding water slowly into an organic phase under stirring wherein the organic phase is prepared by a process in which the acid anhydride-modified poly(olefin chloride), the emulsifier, and the basic substance as a neutralizer, and further, if necessary, a solvent, are dissolved by heating or as they are, or a reversed-phase emulsion may be made by adding the basic substance-added water slowly into an organic phase under stirring wherein the organic phase is prepared by a process in which the acid anhydride-modified poly(olefin chloride) and the emulsifier, and further, if necessary, a solvent, are dissolved by heating or as they are.

(Aqueous Alkyd Resin (B))

Aqueous alkyd resin (B), as used in the present invention, is a reaction product of polyesterification between a polyhydric alcohol and a multifunctional carboxylic acid of which a portion of the acid component may be a long-chain fatty acid from plant oil.

Examples of the polyhydric alcohol include glycerol, trimethylolethane, trimethylolpropane, diethylene glycol, neopentyl glycol, 1,4-cyclohexanedimethanol, 2,2,4-trimethyl-1,3-pentanediol, 1,6-hexanediol, 1,2-propylene glycol, 1,2-propanediol, ethylene glycol, butylene glycol, dipropylene glycol and pentaerythritol.

Examples of the multifunctional carboxylic acid include phthalic anhydride, adipic acid, maleic anhydride, isophthalic acid, sebacic acid, azelaic acid, terephthalic acid, trimellitic anhydride, linoleic acid, linolenic acid, benzoic acid, hexahydrophthalic anhydride, tetrahydrophthalic anhydride, 1,4-cyclohehanedicarboxylic acid and fumaric acid.

Examples of the oil, which can be used for modifying the alkyd resin, include paulownia oil, linseed oil, soy bean oil, safflower oil, castor oil, corn oil, cotton seed oil, sesame oil, coconut oil, dehydrated castor oil, and tall oil.

Aqueous alkyd resin (B), as used in the present invention, has an acid value of preferably 5 to 100, more preferably 10 to 40, in terms of resin solid content. In the case where the acid value in terms of resin solid content is less than 5, there are disadvantages in that the dispersibility of the alkyd resin into water is not sufficient to obtain a stable water-soluble resin. In the case where the acid value in terms of resin solid content is more than 100, there are disadvantages in that the water resistance or weather resistance of the resultant primer coating film (coat) is deteriorated.

Specific examples of aqueous alkyd resin (B), as used in the present invention, include: S118, S126, S346 and S212 (water sol series, made by Dainippon Ink & Chemicals, Inc.); and 376, 580, 585, 5 and 27 (ACRYSET-ARL series, made by Nippon Shokubai Co., Ltd.).

(Aqueous Novolac-type Epoxy Resin (C))

Aqueous novolac-type epoxy resin (C), as used in the present invention, is a resin having one or more epoxy groups per molecule, and a polyglycidyl ether of novolac-type phenol resin is preferable for enhancing the water resistance or gasohol resistance of the primer coating film.

The polyglycidyl ether of novolac-type phenol resin, used in the present invention is, for example, obtainable by a reaction of o-cresol novolac resin or phenol novolac resin with epichlorohydrin in the presence of sodium hydroxide. Then, the resultant product is dispersed into water along with the emulsifier and then used.

Specific examples of the aqueous novolac-type epoxy resin (C), as used in the present invention, include: Denacol EM150 (made by Nagase Chemicals, Ltd.); EPI-REZ 6006W70 and 5003W55 (made by Yuka Shell Co., Ltd.); and WEX-5100 (made by Toto Kasei Co., Ltd.).

(Other Components)

The aqueous primer coating composition according to the present invention, can fitly be combined with other aqueous resins, if necessary, in addition to the aforementioned essential components (A), (B) and (C). Examples of these other aqueous resins include: water-soluble acrylic resins, acrylic emulsions, polyurethane resin emulsions, amino resins, and/or amino resin emulsions.

The total content of the components other than the aforementioned essential components (A), (B) and (C) in the aqueous primer coating composition according to the present invention is in the range of usually 0 to 60 weight %, preferably 0 to 40 weight %, more preferably 0 to 30 weight %, still more preferably 0 to 20 weight %, particularly preferably 0 to 15 weight %, wherein the respective upper limits of these ranges are not included.

The aqueous primer coating composition, according to the present invention, can further comprise other components which are conventionally added to coatings, if necessary. Examples thereof include: additives such as pigments, surfactants, neutralizers, stabilizers, thickeners, defoamers, surface conditioners, leveling agents, pigment dispersants, ultraviolet absorbents, and antioxidants; inorganic fillers such as silica; conductive fillers such as conductive carbon, conductive fillers, and metal powders; and organic reformers and plasticizers.

Examples of the thickeners, which can be mixed into the aqueous primer coating composition according to the present invention, include association-type nonionic urethane thickeners, alkali swelling type thickeners, and inorganic intercalation compounds such as bentonite.

Examples of the pigments, which can be mixed into the aqueous primer coating composition according to the present invention, include: coloring pigments such as inorganic pigments (for example, titanium oxide, carbon black, iron oxide, chromium oxide, and Prussian blue) and organic pigments (for example, azo pigments, anthracene pigments, perylene pigments, quinacridone pigments, indigo pigments, and phthalocyanine pigments); extenders such as talc and precipitated barium sulfate; conductive pigments such as conductive carbon and whiskers coated with antimony-doped tin oxide. These can be used either alone respectively or in combinations with each other. In the case where the pigment is used, the content of the pigment is preferably in the range of 5 to 60 weight % of the total solid content in the composition. In the case where the content is less than 5 weight %, the hiding power is not displayed. In the case where the content is more than 60 weight %, there are disadvantages in that the coating film formability is not obtained.

The aqueous primer coating composition, according to the present invention, can further comprise an organic solvent if the ratio thereof is not more than 40 weight % of water as the solvent. The inclusion of the organic solvent improves the workability and enhances the dispersibility of such as pigments. Examples of such an organic solvent include: aromatic hydrocarbons such as toluene and xylene; aliphatic hydrocarbons such as hexane, heptane and octane; alicyclic hydrocarbons such as cyclohexane, methylcyclohexane and cyclopentane; esters such as ethyl acetate, n-butyl acetate, isobutyl acetate and amyl acetate; ethers such as n-butyl ether and isobutyl ether; ketones such as acetone, methyl ethyl ketone, methyl isobutyl ketone and cyclohexanone; alcohols such as methanol, ethanol, isopropanol, n-butanol, 2-butanol, n-propylene glycol and isopropylene glycol; cellosolves such as ethylene glycol monobutyl ether, ethylene glycol monohexyl ether and ethylene glycol monoethyl ether acetate; carbitols such as diethylene glycol monoethyl ether; propylene glycol monoalkyl ethers such as propylene glycol monomethyl ether, propylene glycol monoethyl ether and propylene glycol monobutyl ether; and other solvents such as dioxane, N-methylpyrrolidone, dimethylformamide and diacetone alcohol.

(Aqueous Primer Coating Composition)

The aqueous primer coating composition, according to the present invention, comprises acid anhydride-modified poly(olefin chloride) emulsion resin (A), aqueous alkyd resin (B) and aqueous novolac-type epoxy resin (C) as described above in detail and, if necessary, further comprises other components such as pigments.

The weight ratios of the above three components (A) to (C) of the aqueous primer coating composition, according to the present invention, in terms of solid content to the total resin solid content in the composition are as follows: (A) is 20 to 60 weight %, preferably 30 to 50 weight %; (B) is in the range of 10 to 60 weight %, preferably 20 to 50 weight %; and (C) is in the range of 10 to 60 weight %, preferably 20 to 50 weight %.

In the case where the above weight ratio of acid anhydride-modified poly(olefin chloride) emulsion resin (A) is less than 20 weight %, the adhesion to the polyolefin materials cannot be obtained enough. On the other hand, in the case where the weight ratio is more than 60 weight %, the co-adhesion with the overcoating paint and the pigment dispersibility are deteriorated.

In the case where the above weight ratio of aqueous alkyd resin (B) is less than 10 weight %, the pigment dispersion stability is deteriorated, and further, the gasohol resistance is low. On the other hand, in the case where this weight ratio is more than 60 weight %, the water resistance is low.

In the case where the above weight ratio of aqueous novolac-type epoxy resin (C) is less than 10 weight %, the water resistance is low and the gasohol resistance also is low. On the other hand, in the case where this weight ratio is more than 60 weight %, it is difficult to obtain a coating film from the primer coating composition (the film formability is deteriorated) and, even if a coating film is obtained, it is not only hard, but also fragile.

An embodiment which is preferable for making it possible to display the effects of the present invention more sufficiently is that the aqueous primer coating composition, according to the present invention, contains a pigment. In this case, as is mentioned above, the content of the pigment is preferably in the range of 5 to 60 weight % of the total solid content in the composition. In the case where the content is less than 5 weight %, the hiding power is not displayed. In the case where the content is more than 60 weight %, there are disadvantages in that the coating film formability is deteriorated and further in that the resultant coating film is fragile.

In the aqueous primer coating composition according to the present invention, aqueous alkyd resin (B) is especially effective for inhibiting the deterioration of the gasohol resistance to enhance the pigment dispersibility, and further for maintaining the conductivity when storing the conductive carbon. In addition, aqueous novolac-type epoxy resin (C) is effective for enhancing the moisture resistance and the gasohol resistance.

The aqueous primer coating composition, according to the present invention, is a product by mixing the emulsion resin containing the acid anhydride-modified poly(olefin chloride) with the aqueous alkyd resin and the aqueous novolac-type epoxy resin in the specific ratio. Therefore, because of synergistic effects by combination of these components with each other in addition to their respective capacities, the deterioration of the water resistance of this composition is prevented with the high adhesion maintained, and further, this composition is excellent in the gasohol resistance and the pigment dispersion stability. Such capacities are unrealized by conventional aqueous primer coating compositions and, especially, demanded when being applied particularly to automotive plastic materials. In this respect, the effects of the present invention are remarkable.

(Objective Materials)

The plastic material, which is an object to which the present invention aqueous primer coating composition is coated, is not especially limited, but examples thereof include: polyolefins such as polypropylene (PP) and polyethylene (PE); acrylonitrile-styrene (AS), acrylonitrile-butadiene-styrene (ABS), poly(phenylene oxide) (PPO), poly(vinyl chloride) (PVC), polyurethane (PU) and polycarbonate (PC).

(Coating)

The aqueous primer coating composition, according to the present invention, can be used, for example, for coating the polyolefin materials such as automotive bumpers, to give the coated things according to the present invention. The coating film (primer coating film) is formed on the polyolefin materials by coating the polyolefin materials with the aqueous primer coating composition and then drying this composition.

The method for coating the polyolefin materials with the aqueous primer coating composition is not especially limited, but may be carried out either by air spray coating or airless spray coating. The coating amount of the aqueous primer coating composition is, for example, adjusted so that the dried-film thickness can be preferably in the range of 2 to 30 µm, more preferably 5 to 20 µm. In the case where the dried-film thickness is less than 2 µm, the thickness might be too thin to obtain a continuous and uniform film. On the other hand, in the case where the dried-film thickness is more than 30 µm, the water resistance or weather resistance might be low. After coating the surface of the polyolefin materials, the coating film is dried. This drying can be carried out at room temperature. However, preferably, drying is carried out by heating in the range of 60 to 140° C. in order to improve the workability and the physical properties. Incidentally, when the drying is carried out by heating, the drying temperature must be selected in the temperature range that does not cause thermal deformation of the materials in consideration of the heat resistance of the materials.

Coating to the polyolefin material is carried out by further coating a overcoating paint onto the primer coating film. The overcoating paint is not especially limited, but examples thereof include one-liquid film baking paints, two-liquid urethane paints, and one-liquid lacquer paints.

The aqueous primer coating composition, according to the present invention, is suitable for coating the polyolefin materials, particularly, polypropylene materials, and more particularly preferable for polypropylene containing a small amount of rubber component. In addition, this aqueous primer coating composition can also be applied to general plastic materials other than the polyolefin materials.

(Effects and Advantages of the Invention)

The present invention can provide: an aqueous primer coating composition of which the deterioration of the water resistance is prevented with the high adhesion maintained, and which is excellent in the gasohol resistance and the pigment dispersion stability; and a thing coated with this aqueous primer coating composition.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to these examples.

Incidentally, hereinafter, unless otherwise noted, the unit "part(s)" denotes "weight part(s)".

In addition, the meanings of the abbreviations described in the tables are shown below.

ACRYSET-ARL 580, 585: aqueous alkyd resins, made by Nippon Shokubai Co., Ltd.

S346: water sol series of aqueous alkyd resins, made by Dainippon Ink & Chemicals, Inc.

FOAMASTER S: silicone defoamer, made by Henkel.

CT324: acetylenic pigment wetting agent "SURFYNOL", made by Air Products, Inc.

EC600JD: conductive carbon "KETJEN BLACK", made by Lion.

R960: titanium oxide pigment "Tipure", made by E.I. Du Pont DE NEMOURS & Co., Ltd.

SS50B: silica NIPSIL series, made by Nippon Silica Kogyo Co., Ltd.

BF-10: precipitated barium sulfate, made by Sakai Chemical Co., Ltd.

DIW: deionized water.

ClPP emulsion: maleic anhydride-modified poly (propylene chloride) emulsion resin produced in Production Example 1.

6006W70: epoxy resin emulsion "EPI-REZ", made by Yuka Shell.

EM150: epoxy resin emulsion "Denacol", made by Nagase Chemicals, Ltd.

KL245: silicone surface conditioner "POLYFLOW" made by Kyoei Kagaku Co., Ltd.

ASE60: alkali swelling type thickener "ACRYSOL", made by Rohm and Haas.

DMEA: dimethylaminoethanol

Production Example 1

Production of Maleic Anhydride-modified poly (propylene chloride) Emulsion Resin A reactor as equipped with stirring vanes, a thermometer, a temperature-controlling rod, and a condenser was charged with 233 parts of Hardlen M128P (maleic anhydride-modified poly(propylene chloride) made by Toyo Kasei Kogyo Co., Ltd.; chlorine content=21 weight %; weight-average molecular weight=40,000), 59 parts of Emulgen 920 (nonyl phenyl polyoxyethylene ether, made by Kao Corporation), 62 parts of Solvesso-100 (aromatic hydrocarbon made by Exxon) and 27 parts of acetic acid carbitol. These materials were dissolved by heating at 110° C. for 1 hour and then cooled to not higher than 100° C., and thereto 619 parts of deionized water containing 5 parts of dissolved dimethylaminoethanol was dropwise added over a period of 1 hour to prepare a reversed-phase emulsion. After cooling, the resultant emulsion was filtrated through a 400-mesh gauze.

The resultant maleic anhydride-modified poly(propylene chloride) emulsion resin had a nonvolatile content of 30.5 weight % and an average particle diameter of 0.1 µm (measured by laser light scattering method).

Production Example 2

Production of Pigment-dispersed Paste (a)

Under stirred conditions, 360 parts of ACRYSET-ARL 580 (aqueous alkyd resin dispersion, made by Nippon Shokubai Co., Ltd.), 45 parts of SURFYNOL CT324 (acetylenic pigment wetting agent, made by Air Products, Inc.), 7 parts of FOAMASTER S (silicone defoamer, made by Henkel), 249 parts of deionized water, 25 parts of KETJEN BLACK EC600JD (conductive carbon, made by Lion), and 314 parts of Tipure R960 (titanium oxide pigment, made by E.I. Du Pont DE NEMOURS & Co., Ltd.) were added in this order into a vessel as equipped with a stirrer. After 1-hour stirring, dispersion was carried out with a laboratory DYNO-MILL of 1.4 liters till a grind gauge showed 20 µm or less.

The resultant pigment-dispersed paste (a) had a nonvolatile content of 54 weight % and a viscosity of 62 KU (20° C.).

Production Examples 3 to 9

Production of Pigment-dispersed Pastes (b) to (h)

Pigment-dispersed pastes (b) to (h) were produced in the same way as of Production Example 2 except that the kinds and the combining ratios of the raw materials used for mixing were those shown in Table 1. Incidentally, the nonvolatile contents of the resultant pigment-dispersed pastes were also jointly listed in Table 1.

TABLE 1

| Production Example | | 2 | 3 | 4 | 5 | 6 | 7 | 8 | 9 |
|---|---|---|---|---|---|---|---|---|---|
| Pigment-dispersed paste | | a | b | c | d | e | f | g | h |
| Raw materials (weight parts) | ACRYSET-ARL 580 | 360 | 276 | | | 234 | 478 | 57 | 107 |
| | ACRYSET-ARL 585 | | | 290 | | | | | |
| | S346 | | | | 375 | | | | |
| | FOAMASTERS | 7 | 5 | 6 | 5 | 7 | 4 | 6 | 6 |
| | CT324 | 45 | 35 | 41 | 36 | 44 | 30 | 43 | 40 |
| | EC600JD | 25 | | 23 | 20 | 25 | 17 | 24 | 23 |
| | R960 | 314 | 323 | 283 | 249 | 305 | 208 | 296 | 280 |
| | SS50B | | 57 | | | | | | |
| | BF-10 | | | | | | | | |
| | DIW | 249 | 304 | 358 | 315 | 386 | 263 | 575 | 544 |
| Nonvolatile content (weight %) | | 54 | 54 | 48 | 55 | 48 | 46 | 39 | 39 |

Example 1

Under stirred conditions, 221 parts of the maleic anhydride-modified poly(propylene chloride) emulsion resin, as produced in Production Example 1, and 328 parts of pigment-dispersed paste (a), as produced in Production Example 2, and 71 parts of EPI-REZ 6006W70 (epoxy resin emulsion, made by Yuka Shell) and 3 parts of POLYFLOW KL245 (silicone surface conditioner, made by Kyoei Kagaku Co., Ltd) and 355 parts of deionized water and 2 parts of dimethylaminoethanol and 20 parts of ACRYSOL ASE60 (alkali swelling type thickener, made by Rohm and Haas) were added in this order into a reactor as equipped with a stirrer, and the resultant mixture was stirred for 1 hour.

The resultant aqueous primer coating composition (1) had a nonvolatile content of 29 weight % and a viscosity of 70 KU (20° C.). These results are listed in Table 2.

This resultant aqueous primer coating composition (1) was spray-coated onto a polypropylene material (which had been washed with a neutral detergent) (size: 70 mm×260 mm×3 mm) in order to obtain a dried-film thickness of 10 μm, and then dried at 80° C. for 10 minutes. After being cooled, the polypropylene material was spray-coated with a solvent two-liquid metallic base paint (made by Nippon Bee Chemical Co., Ltd.) in order to obtain a dried-film thickness of 15 μm, and then with a solvent two-liquid clear paint (made by Nippon Bee Chemical Co., Ltd.) in order to obtain a dried-film thickness of 30 μm, and then dried at 80° C. for 30 minutes, thus producing a test piece.

A checkerboard square peeling test of the resultant test piece was carried out in order to evaluate the adhesion. In addition, a moisture resistance test was carried out. Furthermore, an appearance evaluation and the checkerboard square peeling test were carried out after the moisture resistance test. Furthermore, a gasohol resistance test was carried out. In addition, an evaluation of pigment dispersion stability was also carried out. The results are listed in Table 3. Incidentally, the methods for these tests and evaluations are as follows:

(Checkerboard Square Peeling Test)

A checkerboard square cellulose adhesive tape peeling test was carried out in accordance with JIS K5400. One hundred squares (2 mm×2 mm) were prepared to carry out the cellulose adhesive tape peeling test. The number of the checkerboard squares that did not peel off was counted. The evaluation standard is as follows:
◯: 0/100 (not peeled off)
Δ: 1/100 to 50/100 (not more than 50% peeled off)
×: 51/100 to 100/100 (not less than 51% peeled off)

(Moisture resistance Test)

The above-coated polyolefin material was left under an atmosphere of 50° C. and a humidity of 98% for 10 days, and then subjected to the above checkerboard square peeling test and the appearance evaluation.

The appearance evaluation standard of the above moisture resistance test is as follows:
◯: An appearance change was not detected in comparison with the initial state (before the moisture resistance test).
×: A swollen or dull portion was detected in comparison with the initial state (before the moisture resistance test).

(Gasohol Resistance Test)

A piece of the above-coated polyolefin base material (3 cm×3 cm) was immersed into gasohol obtained by adding ethanol to regular gasoline in a ratio of 10 volume %, and a measurement was made about a time passing till the length of a peeled edge of the coating film reached 2 mm. The time of not less than 30 minutes was evaluated as ◯, and the time less than 30 minutes was evaluated as ×.

(Evaluation of Pigment Dispersion Stability)

An amount of 400 ml of paint was sampled into a transparent beaker of 500 ml having a plain bottom, and then stirred at 200 rpm/min at room temperature with a Teflon-coated magnetic stirrer for 24 hours. Thereafter, separation and sedimentation of the pigment were examined. The evaluation standard is as follows:
◯: An appearance change was not detected.
×: Separation and sedimentation of the pigment were observed.

Examples 2 to 5 and Comparative Examples 1 to 4

Aqueous primer coating compositions (2) to (5) and comparative aqueous primer coating compositions (6) to (9) were obtained in the same way as of Example 1 except that the kinds and the combining ratios of such as resins used for mixing were those shown in Table 2. Then, they were tested and evaluated in the same way as of Example 1. The results are listed in Table 3.

TABLE 2

|  |  |  | Example | | | | | Comparative Example | | | |
|---|---|---|---|---|---|---|---|---|---|---|---|
|  |  |  | 1 | 2 | 3 | 4 | 5 | 1 | 2 | 3 | 4 |
| Combination (weight parts) | Pigment-dispersed paste | a (Production Example 2) | 328 | | | | | | | | |
|  |  | b (Production Example 3) | | 428 | | | | | | | |
|  |  | c (Production Example 4) | | | 364 | | | | | | |
|  |  | d (Production Example 5) | | | | 413 | | | | | |
|  |  | e (Production Example 6) | | | | | 317 | | | | |
|  |  | f (Production Example 7) | | | | | | 495 | | 495 | |
|  |  | g (Production Example 8) | | | | | | | 348 | | |
|  |  | h (Production Example 9) | | | | | | | | | 368 |
|  | ClPP emulsion | | 221 | 221 | 287 | 110 | 166 | 55 | 276 | 193 | 110 |
|  | 6006W70 | | 71 | 71 | 47 | 47 | | 71 | 106 | 12 | 166 |
|  | EM150 | | | | | | 166 | | | | |
|  | KL245 | | 3 | 3 | 3 | 3 | 3 | 3 | 3 | 3 | 3 |
|  | ASE60 | | 20 | 20 | 20 | 20 | 20 | 20 | 20 | 20 | 20 |
|  | DMEA | | 2 | 2 | 2 | 2 | 2 | 2 | 2 | 2 | 2 |
|  | DIW | | 355 | 307 | 297 | 422 | 297 | 375 | 227 | 297 | 300 |
| Resin ratio (weight %) | CIPP emulsion | | 40 | 40 | 44 | 20 | 30 | 10 | 50 | 35 | 20 |
|  | Aqueous alkyd | | 30 | 30 | 28 | 60 | 20 | 60 | 5 | 60 | 10 |
|  | Novolac epoxy | | 30 | 30 | 28 | 20 | 50 | 30 | 45 | 5 | 70 |
| Nonvolatile content (weight %) | | | 29 | 33 | 29 | 29 | 30 | 29 | 30 | 29 | 30 |

TABLE 3

|  | Example | | | | | Comparative Example | | | |
|---|---|---|---|---|---|---|---|---|---|
|  | 1 | 2 | 3 | 4 | 5 | 1 | 2 | 3 | 4 |
| Checkerboard square peeling test | ○ | ○ | ○ | ○ | ○ | ○ | ○ | ○ | X |
| Moisture resistance test — Checkerboard square peeling test | ○ | ○ | ○ | ○ | ○ | X | ○ | X | X |
| Moisture resistance test — Appearance evaluation | ○ | ○ | ○ | ○ | ○ | ○ | ○ | X | ○ |
| Gasohol resistance test | ○ | ○ | ○ | ○ | ○ | X | ○ | X | ○ |
| Evaluation of pigment dispersion stability | ○ | ○ | ○ | ○ | ○ | ○ | X | ○ | ○ |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous primer coating composition, comprising acid anhydride-modified poly(olefin chloride) emulsion resin (A), aqueous alkyd resin (B) and aqueous novolac-type epoxy resin (C), wherein the contents of the (A), (B), and (C) are (A) 20 to 60 weight %, (B) 10 to 60 weight %, and (C) 10 to 60 weight % in terms of solid content weight % to the total resin solid content in the composition.

2. An aqueous primer coating composition according to claim 1, further comprising a pigment in a ratio of 5 to 60 weight % of the total solid content in the composition.

3. An aqueous primer coating composition according to claim 1, wherein an acid anhydride-modified poly(olefin chloride) in resin (A) has a chlorine content of 10 to 30 weight %, an acid anhydride moiety content of 1 to 10 weight %, and a weight-average molecular weight of 20,000 to 200,000.

4. An aqueous primer coating composition according to claim 1, wherein resin (B) has an acid value of 5 to 100 in terms of resin solid content.

5. An aqueous primer coating composition according to claim 1, wherein resin (C) includes a polyglycidyl ether of novolac-type phenol resin as a main component.

6. A coated article, which is coated with the aqueous primer coating composition as recited in claim 1.

* * * * *